US006485608B1

(12) United States Patent
McDonald et al.

(10) Patent No.: US 6,485,608 B1
(45) Date of Patent: Nov. 26, 2002

(54) MANUFACTURE OF PLAIN BEARINGS

(75) Inventors: Julie Ann McDonald, Rugby (GB);
John Edward Wheatley, Rugby (GB);
Anthony Latkowski, Rugby (GB);
David Geoffrey Hall, Rugby (GB)

(73) Assignee: Glacier Garlock Bearings, Inc.,
Charlotte, NC (US)

( * ) Notice: Subject to any disclaimer, the term of this patent is extended or adjusted under 35 U.S.C. 154(b) by 0 days.

(21) Appl. No.: 09/446,303

(22) PCT Filed: Jun. 15, 1998

(86) PCT No.: PCT/GB98/01740

§ 371 (c)(1),
(2), (4) Date: Dec. 17, 1999

(87) PCT Pub. No.: WO98/58986

PCT Pub. Date: Dec. 30, 1998

(30) Foreign Application Priority Data

Jun. 21, 1997 (GB) .............................................. 9713079

(51) Int. Cl.[7] .............................................. D21H 27/00
(52) U.S. Cl. ........................ 162/103; 162/105; 162/108; 162/141; 162/145; 162/146; 162/164.1; 162/168.1; 162/169; 162/181.1; 162/181.9; 162/183; 384/42
(58) Field of Search ................................ 162/103, 105, 162/108, 141, 145, 146, 206, 181.1, 181.2, 181.3, 181.4, 181.5, 181.6, 181.7, 181.8, 181.9, 164.1, 168.1, 169, 183; 384/42

(56) References Cited

U.S. PATENT DOCUMENTS 5,616,406 A 4/1997 Nakamura et al.

FOREIGN PATENT DOCUMENTS

| EP | 0 456 471 A2 | 11/1991 |
| JP | 93-191633 | 10/1991 |
| WO | WO 95/02772 | 1/1995 |
| WO | WO 97/06204 | 2/1997 |

OTHER PUBLICATIONS

International Search Report for PCT/GB98/01740.

Notification of Transmittal of the International Preliminary Examination Report for International Application No. PCT/GB98/01740.

*Primary Examiner*—Peter Chin
(74) *Attorney, Agent, or Firm*—John M. Harrington; Kilpatrick Stockton LLP

(57) ABSTRACT

The bearing comprises a metal backing, a sintered layer on said metal backing, and a lining layer infiltrated into pores of the sintered layer and standing proud thereof to provide a bearing surface. The lining layer comprises polytetrafluoroethylene including 2 to 10% by volume of fibrillated aramid fibres.

13 Claims, 1 Drawing Sheet

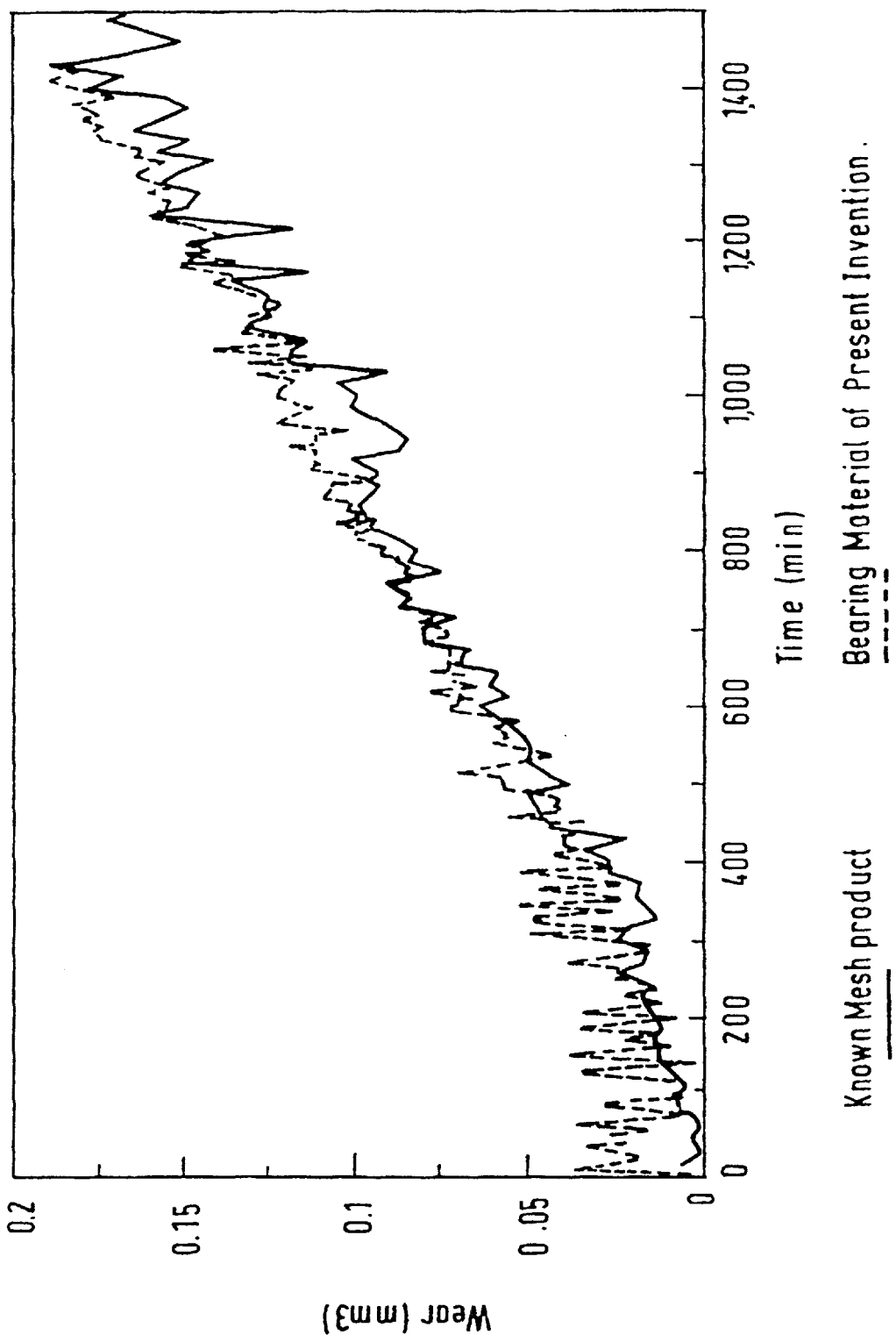

MANUFACTURE OF PLAIN BEARINGS

BACKGROUND OF THE INVENTION

This invention is concerned with a method of manufacturing plain bearings and with materials and bearings manufactured by such methods.

Many types of plain bearings have a bearing surface layer which contains a high proportion of a fluoro-polymer such as polytetrafluoroethylene (PTFE), since such polymers have good low friction properties. Such bearing surface layers are inherently weak so that they are applied to a supporting substrate which is normally made of metal. However, as fluoro-polymers are difficult to secure to a substrate, in one common type of bearing, an intermediate layer is included which is usually made of sintered metal, eg bronze. In manufacturing this type of bearing, the PTFE is mixed with solvent, and fillers, to form a "mush" which is paste-like and is spread over the surface of the sintered metal before being forced into the interstices of the sintered metal so that the bearing surface layer material is bonded to the sintered metal. Because of the necessity to remove the solvent, the material can only be formed with a relatively thin surface layer (about 50 microns or less) over the sintered metal otherwise solvent induced blistering occurs. The thickness of the surface layer produced above the sintered bonding layer is also affected by the fact that the mush is rolled into the interstices of the sinter and to achieve sufficient impregnation to prevent the fluoro-polymer from delaminating from the backing in use, a relatively high pressure may be required which results in a low layer thickness above the sintered bonding layer. Because the surface layer is relatively thin, it cannot normally be machined to improve the surface quality or to perform a sizing operation to form a bearing having a precise wall thickness and bore dimension.

EP-A-0708892 describes a bearing made from a material comprising a metal backing having a sintered layer thereon and a bearing material lining comprising polytetrafluoroethylene and from 2 to 10 volume % of fibrillated aramid fibres infiltrated into the pores of the sintered bonding layer. This document also describes making a sheet of the bearing material by a paper-making type route, fusing and bonding the sheet by heat and pressure to the sintered bonding layer. However, the layer thickness above the sintered bonding layer on the backing material is again only 25 μm.

WO97/06204 describes the manufacture of a bearing material in sheet form comprising an aromatic polyamide pulp and a fluororesin as main constituents. The method of manufacture is by a paper-making type process. However, no mention is made of any method of attaching the material so formed to a metal backing. Indeed, thicker material is obtained by forming a stack of a plurality of layers of the sheet material and sintering them together under an applied pressure. However, this results in only a monolithic block of the material from which a bearing may be formed by machining for example but which lacks the strengthening effect of a supporting metal backing where thin bearing layers or wall thickness are required.

SUMMARY OF THE INVENTION

It is an object of the present invention to provide a method of manufacturing a plain bearing based on a fluoro-polymer, which method enables a thicker bearing material layer above any supporting or bonding metal layer to be formed.

BRIEF DESCRIPTION OF THE DRAWING

The FIGURE shows test results for the new bearing material impregnated into bronze sinter compared with an available mesh-based bearing product.

DETAILED DESCRIPTION

According to a first aspect of the present invention there is provided a method of manufacturing a bearing material, the method including the steps of forming a water-based slurry having a solids content comprising 30 to 80% by volume of a fluoro-polymer, 5 to 30% by volume of web-forming fibrillated fibres, and 5 to 40% by volume of filler material selected from at least one of the group comprising: inorganic fibres; inorganic particulate material; metal fibres; metal powders; organic fibres; organic particulate material; and, organic matrix strengthening agents, the web-forming and filler materials being resistant to temperatures above the melting point or curing temperature of the fluoro-polymer; depositing a layer of the slurry on to a substrate so that the water drains from the layer and a deposited layer is formed in which the web-forming fibres form a web containing the fluoro-polymer and the filler material; and, heating the deposited layer to a temperature above the melting point of the fluoro-polymer in order to cure the fluoro-polymer.

An important advantage of the method according to the invention is that a relatively thick bearing surface layer can be formed which can, therefore, be machined. The thickness of the layer of bearing material, so produced may lie in the range from 50 to 400 μm above any backing or bonding layer. A further advantage of the method of the present invention is that the paper-making type route imparts a much lower degree of mechanical working to the fluoro-polymer and consequently results in less hardening thereof allowing the material to be more easily impregnated into porous bonding layers such as sintered bronze at lower impregnation pressures allowing thicker residual layers above the sinter to be obtained. Conventional "mush" routes impart a relatively high degree of mechanical work to the polymer during formation and spreading of the mush making it stiffer and more resistant to being impregnated into the sinter and thus requiring higher pressure which, in part, contributes to a low layer thickness above the sinter.

The method of preparing the basis deposited layer may be relatively conventional apparatus as used in the paper making industry, a typical example being a well-known Fourdrinier-type paper making machine or a cylinder-type machine.

The deposited layer on the substrate after the water has drained from the deposited slurry gains its handling strength from the web of fibrillated fibres within and about which the fluoro-polymer and fillers are retained, the deposited layer having a paper-like appearance. The need for handling strength for subsequent processing operations results in the need for a minimum of 5 vol % of fibrillated fibres. Above 30 vol % low friction properties begin to deteriorate.

Preferably the content of fibrillated fibres may be in the range from 10 to 30 vol %.

Preferably, the fibrillated fibres (frequently referred to as "pulp") comprise an aramid material such as Kevlar or Twaron (trade names) for example and, more preferably a para-aramid material.

A primary requirement of the fibrillated fibres is that they are able to withstand the heating step for curing the fluoro-polymer thus, other fibre materials are possible so long as this condition is fulfilled.

In a preferred embodiment of the present invention, the fluoro-polymer may comprises polytetrafluoroethylene (PTFE) which requires a temperature above its melting point, about 330° C., to cure.

Although PTFE is the preferred fluoro-polymer for use in this invention, other fluoro-polymers such as perfluorinated ethylene-propylene, methyl perfluoroalkoxy, perfluoroalkoxy, chlorotrifluoroethylene, tetrafluoroethylene-ethylene and polyvinylidene difluoride, for example may be used instead or in addition to PTFE.

The fillers are included in the method and material of the present invention to provide strengthening and/or reinforcement of the material matrix and also to improve the actual bearing properties such as wear resistance and friction coefficient for example.

Suitable inorganic fibres may include for example glass or carbon fibres for example.

Suitable inorganic particulate or powder material may include calcium fluoride, clay, molybdenum disulphide, tungsten disulphide, graphite, silica, alumina, lead oxide, copper oxide for example.

Suitable metal fibres and powders may include bronze, brass, lead, tin, zinc for example.

Organic materials may include fillers such as thermosetting or thermoplastic resins for example which may be employed to provide further strengthening of the matrix. Such additional polymers may include polyphenylene sulphide, polyphenylene sulphone, polyimide, nylon 4.6, polyether ether ketone, polyoxymethylene, polyester, polyurethane, polyamideimide, polyether sulphone, polyethyleneterephthalate and polyether imide for example.

The slurry may include latex-type materials to improve the handling strength of the raw deposited material. However, such additions to the slurry will decompose during the heating step to cure the fluoro-polymer but not to the detriment of the resulting cured bearing material.

The slurry will also contain further additions which are relevant to the formation of the slurry and conducive to the deposition and formation of a layer of solids of the desired composition onto the draining substrate of the paper-making apparatus. Such additions may comprise coagulants and flocculants such as colloidal silica, polymer coagulants and alum for example. However, such materials to perform the required functions are known to those skilled in the art and will not be elaborated upon further.

The deposited layer once removed from the draining substrate possesses in the region of around 50 vol % porosity. The thickness of the deposited layer of the raw undensified uncured material may be in the range from about 200 μm to about 2 mm. The lower thickness of 200 μm is a practical limit below which the strength becomes too low for easy handling whilst the upper limit is governed by the de-watering characteristics of the basic paper making process.

For the purpose of forming a bearing, the preferred range may be from 200 to 800 μm when unconsolidated.

Once the deposited layer is formed there are potentially several routes which may be taken with respect to attaching the layer to a backing and the heating step to cure the fluoro-polymer. The deposited layer may, for example, be adhered to a supporting substrate either before or after the heating step to cure the polymer. The supporting substrate may be any known in the art such as steel, stainless steel, bronze and aluminium for example.

Various alternatives exist for attaching the bearing material layer to a strong supporting backing. Essentially, there are two basic attaching alternatives comprising: (i) mechanically attaching the bearing layer to a metal backing wherein the bearing material layer is impregnated into a porous surface or engages with physical features formed on the surface of the backing material such as metal wire mesh or a perforated metal backing; or, (ii) attaching the bearing material layer to a strong backing layer by adhesive means; or, (iii) a combination of mechanical and adhesive attachment. Within each alternative there are options in the process steps available or in the sequence of process steps which are employed.

Where the bearing material layer is mechanically attached to a porous sintered bonding layer, the raw deposited layer may be impregnated into the sinter surface followed by heating to cure. A backing substrate is normally made of metal so that, if the layer is secured to the substrate before the heating step, the substrate assists in conducting heat to all parts of the layer. This route also effects substantially full consolidation of the porous bearing material layer during the impregnation step.

The thickness of the bearing material layer above the sintered bonding layer or backing surface after impregnation and consequent consolidation may preferably lie within the range from 50 to 400 μm and, more preferably within the range from 100 to 250 μm prior to any machining operation.

Where the bearing material layer is attached to a backing by adhesive means: (a) it may first be densified to remove or reduce porosity by rolling for example then cured and finally adhered to the backing material with an adhesive layer; or (b) the porous bearing material layer may be adhered to the backing layer, densified and then cured; or, (c) the porous layer may be densified, adhered to the backing layer and finally cured; or, (d) the bearing material layer may be adhered to the backing layer, cured and then consolidated; or, (e) the bearing material layer may be cured, adhered to the backing layer and consolidated; or, (f) the bearing material layer may be cured, consolidated and adhered to the backing layer. With alternatives (b), (c) and (d), the adhesive used must be capable of withstanding the curing temperature and with alternative (b), (d) and (e), the adhesive layer must be capable of withstanding the densifying step which may be by rolling or any other suitable alternative method. Alternative (b), (d) and (e) have the advantage that the porosity in the bearing layer may be utilised to enhance the strength of bonding with the adhesive.

Suitable adhesives may include epoxies, acrylics, cyanoacrylates, polyurethanes, phenolics, isoprenes, styrene butadienes, fluoro-polymers, polyesters and nylons. Methods of adhesive application may include roller coating, curtain coating, spray coating or as a film (e.g. hot melt, pressure sensitive, or contact types). Where adhesives are used, the bearing material may require a pre-treatment such as chemical etching, plasma pre-treatment, irradiation, or the use of chemical coupling agents or adhesion promoters for example prior to the application of adhesive.

It is possible to deposit the layer in several stages, ie one layer on top of another to produce a thicker deposited layer.

It is possible to form a variable composition within the deposited layer by control of the slurry during the paper making process, ie by having two or more deposition positions where another slurry composition is deposited on a preceding slurry composition. Alternatively, individual layers of different compositions may be made, pressed together and cured.

Where the material is produced in a plurality of deposited layers, the layers may be produced with the composition of the slurry varying in each layer. For example, the layer intended to form the sliding surface of the bearing may incorporate more of the fluoro-polymer than the stage intended to form the lower surface thereof adjacent the substrate which may incorporate other polymers which bond more effectively to the material of the substrate. In other words, the composition of the bearing material varies through its thickness from a composition which can more easily bond to the substrate to a composition providing superior bearing properties.

The thickness of each deposited layer may be varied according to its intended function within the final bearing. Thus, thinner layers which would not on their own be handlable may be employed, e.g. as the bonding layer between the bearing sliding material layer per se and a strong backing layer.

The strong backing may have a layer of another polymer, which is compatible with the fluoro-polymer, deposited thereon to promote adhesion between the backing and the deposited layer.

Another possibility is for a filler material to be hollow and to contain a liquid or other lubricant which is gradually released as the bearing wears.

According to a second aspect of the present invention, there is provided a bearing material when produced by the method of the first aspect of the present invention.

According to a third aspect of the present invention there is provided a bearing comprising the material of the second aspect of the present invention bonded to a strong backing material.

In order that the present invention may be more fully understood, examples will now be described by way of illustration only with reference to the accompanying graph which shows a comparison of wear vs time of a known impregnated mesh type bearing material and a bearing material according to the present invention.

EXAMPLE 1

This example is of a method of manufacturing a plain bearing. The method comprises forming a water-based slurry having a solids content of 2% weight/volume (10 kg solids in 500l of water). The solids content was 73% by volume PTFE (mixed in as PTFE dispersed in water (55% PTFE by weight)), 10% by volume fibrillated para-aramid fibres (the fibres were 0.74 mm long on average and 12 to 15 μm in diameter), 4% by volume graphite powder, and 13% by volume glass fibres (150 μm long on average and 12 μm in diameter). In a variation of the illustrative method, the graphite was omitted from the slurry, the PTFE content was reduced to 67% by volume, the glass fibre content was kept at 13% by volume, and the para-aramid fibre content was increased to 20% by volume.

The para-aramid fibres were fibrillated so that they were able to form a web. The glass fibres were included as reinforcing fibres. It should be noted that the fibres used are resistant to temperatures above the melting point of the PTFE ( which is about 330° C.).

The method also comprises depositing a layer of the slurry on to a wire mesh so that the water in the slurry drains from the layer and a deposited layer is formed in which the para-aramid fibres form a web containing the PTFE, the graphite, and the glass fibres. The web formed by the para-aramid fibres has randomly oriented fibres adhering to one another and serves to form a supporting web to enable the deposited layer to be handled. The slurry was deposited by spraying it on to the wire mesh as the mesh was moving. The water drained away through the mesh leaving a deposited layer which was self-supporting and able to be lifted from the mesh belt, dried and coiled up.

The deposited layer, which was approximately 500 microns thick, was removed from the wire mesh and positioned on a metal substrate. The substrate was aluminium sheet 0.3 mm in thickness. The substrate was pre-formed with metal tangs projecting about 0.4 mm therefrom. The tangs were formed by the edges of holes punched through the substrate. The metal substrate and the layer were passed between compressing rollers to force the tangs into the deposited layer so that the deposited layer was adhered to the substrate. The illustrative method also comprises a heating step in which the deposited layer is heated to above the melting point of the PTFE in order to cure the PTFE. In this step, which was carried out after the deposited layer had been adhered to the substrate, heating took place in an oven for 10 minutes at 380° C.

The completed bearing material had a bearing surface layer which was formed by the deposited layer after curing and which was 250 microns in thickness.

EXAMPLE 2

A slurry was formed in a similar manner to that described with reference to Example 1 but having a final solids content of: 65 vol % PTFE; 20 vol % Kevlar (trade name); and, 15 vol % calcium fluoride (+stabilisers and additives such as coagulants etc.) in the dry deposited material layer which was 0.49 mm in thickness. The tensile strength of the unconsolidated material as deposited and prior to curing was 0.7 MPa. The unconsolidated material was impregnated into a porous bronze sinter layer of 0.25 mm thickness on a steel backing layer by passing the two materials through rollers. The material is consolidated during this rolling step in addition to being impregnated into the bronze sinter. The impregnated bearing material was then heated at 380° C. for 10 minutes to cure the PTFE. The final material possessed a layer of bearing material above the sintered bonding layer of 0.165 mm in thickness.

The above example was made on small scale experimental equipment. Similar material made on a production line was cured by means of induction heating via the metal backing for approximately 1 minute at 380° C.

EXAMPLE 3

A slurry was formed in a similar manner to that described with reference to Example 1 but having a final solids content of: 61.8 vol % of PTFE; 20 vol % of Kevlar (trade name); 13 vol % of glass fibre; 3.2 vol % of colloidal silica (as a coagulant); and, 2 vol % of carbon black (as a pigment) and other additives as stabilisers. The tensile strength of the unconsolidated material as deposited and prior to curing was 0.9 Mpa. The unconsolidated material was impregnated into a bronze sinter layer of 0.25 mm thickness on a steel backing layer by passing the two materials through rollers. The material was consolidated during this rolling step in addition to being impregnated into the bronze sinter. The impregnated bearing material was then heated to 380° C. for ten minutes to cure the PTFE. Alternatively, when the cure process was carried out on a factory production line, the material underwent an induction cure for approximately one minute at 380° C.

The final material possessed a layer of bearing material above the sintered bonding layer of 0.165 mm in thickness.

The wear and friction properties of this material is comparable with that found for other bearing products. See Table 1.

TABLE 1

Wear and friction properties of produced bearing material

| | Wear (Microns) | Friction coefficient |
|---|---|---|
| Bearing material of invention | 17 | 0.12 |
| Mush-route polymer bearing comprising glass-filled PTFE | 16 | 0.15 |
| Commercial mesh-based bearing 1 comprising PTFE filled with glass and graphite | 23 | 0.12 |
| Commercial mesh-based bearing 2 comprising PTFE filled with glass and graphite | 42 | 0.11 |

Wear was measured on cylindrical bushes using an oscillating bush test operating at PV=0.18 for 130,000 cycles. Friction coefficient was measured using a pin-on-disc tribometer.

The attached Figure shows test results for the new bearing material impregnated into bronze sinter compared with an available mesh-based bearing product. The tests were conducted on flat samples using a block-on-ring wear test apparatus.

EXAMPLE 4

The composition was as for Example 3 (61.8% PTFE etc). Thickness and strength of material was also as for Example 3.

The unconsolidated material was impregnated into a bronze mesh of 0.39 mm thickness by passing the two materials through rollers. The material was consolidated during this rolling step in addition to being impregnated into the mesh. Final thickness of the impregnated mesh was 0.39 mm. Cure was at 380° C. for ten minutes.

EXAMPLE 5

A slurry was formed in a similar manner to that described with reference to Example 1 but having a final solids content of: 61.8 vol % of PTFE; 20 volt of Kevlar (trade name); 13 vol % of glass fibre; 3.2 vol % of colloidal silica (as a coagulant); and, 2 vol % of carbon black (as a pigment) and other additives as stabilisers. The thickness of the material prior to densification was 0.53 mm and the strength thereof in the as deposited form was 0.9 MPa. A phenolic-type adhesive was applied to the surface of the bearing material by roller coating. The coated material was pre-heated to activate the adhesive prior to passing through a calendar nip with a 0.3 mm thick stainless steel backing sheet to form a laminate. The laminate was then passed twice through heated rollers to consolidate the bearing material. Following consolidation, the laminate was heated to 160° C. to cure the adhesive and then heated to 380° C. to cure the PTFE. The laminate material was then formed into cylindrical bushes for testing. The thickness of the consolidated bearing material following curing was 0.23 mm. The phenolic resin adhesive was particularly advantageous in that it was able to maintain a good adhesive bond between the substrate and bearing material after the PTFE curing step.

What is claimed is:

1. A method of manufacturing a bearing material, the method including the steps of:

(a) forming a water based slurry having a solids content comprising 30 to 80% by volume of a fluoro-polymer, 10 to 30% by volume of web-forming fibrillated fibers, and 5 to 40% by volume of filer material selected from at least one of the group comprising: inorganic fibers; inorganic particulate material; metal fibers; metal powders; organic fibers; organic particulate material; and, organic matrix strengthening agents, the web-forming and filler materials being resistant to temperatures above the melting point or curing temperature of the fluoropolymer;

(b) depositing a layer of the slurry on to a substrate so that the water drains from the layer and a deposited layer is formed in which the web-forming fibers from a web containing the fluoro-polymer and the filler material;

(c) consolidating the layer by pressure;

(d) heating the material to a temperature above the melting point of the fluoro-polymer in order to cure the fluoro-polymer, (e) attaching a strong backing layer by adhesive means wherein the thickness of said deposited layer being chosen such that the thickness of the bearing material layer above the backing layer after consolidation lies within the range from 50 to 400 $\mu$m.

2. A method according to claim 1 wherein the final tree steps are performed in the order (e), (c), (d).

3. A method according to claim 1 wherein the final three steps are performed in the order (c), (e), (d).

4. A method according to claim 1 wherein the final three steps are performed in the order (e), (d), (c).

5. A method according to claim 1 wherein the final three steps are performed in the order (d), (e), (c).

6. A method according to claim 1 wherein the final three steps are performed in the order (d), (c), (e).

7. A method according to claim 1 wherein the adhesive means is a phenolic adhesive.

8. A method according to claim 1 wherein the deposited layer is formed in a plurality of stages by depositing a further slurry on top of a preceding slurry.

9. A method according to claim 8 wherein the compositions of said further slurry and said preceding slurry are different.

10. A method according to claim 8 wherein the thickness of each deposited layer is different.

11. A method according to claim 1 wherein the strong backing layer has a layer of another polymer which is compatible with the fluoro-polymer, deposited thereon to promote adhesion between the backing and the deposited layer.

12. A method according to claim 1 wherein the filler contains a liquid or other lubricant which is gradually released as the bearing material wears.

13. A bearing material when made by the method of claim 1.

* * * * *

UNITED STATES PATENT AND TRADEMARK OFFICE
CERTIFICATE OF CORRECTION

PATENT NO.   : 6,485,608 B1
DATED        : November 26, 2002
INVENTOR(S)  : McDonald et al.

It is certified that error appears in the above-identified patent and that said Letters Patent is hereby corrected as shown below:

<u>Title page,</u>
Item [57], ABSTRACT, should read as follows: -- A method of manufacturing a bearing material, a bearing material and a bearing having the bearing material on a strong backing are described. The method includes the steps of forming a water-based slurry having a solids content comprising 30 to 80% by volume of a fluoro-polymer, 5 to 30% by volume of web-forming fibrillated fibres, and 5 to 40% by volume of filler material selected from at least one of the group comprising: inorganic fibres; inorganic particulate material; metal fibres; metal powders; organic fibres; organic particulate material; and, organic matrix strengthening agents, the web-forming and filler materials being resistant to temperatures above the melting point or curing temperature of the fluoro-polymer; depositing a layer of the slurry on to a substrate so that the water drains from the layer and a deposited layer is formed in which the web-forming fibres form a web containing the fluoro-polymer and the filler material; and, heating the deposited layer to a temperature above the melting point of the fluoro-polymer in order to cure the fluoro-polymer. --

<u>Column 8,</u>
Line 4, that portion reading "and 5 to 40% by volume of filer material selected from" should read -- and 5 to 40% by volume of filler material selected from --.
Line 27, that portion reading "2. A method according to claim 1, where the final tree" should read -- 2. A method according to claim 1, where the final three --.

Signed and Sealed this

Thirteenth Day of May, 2003

JAMES E. ROGAN
*Director of the United States Patent and Trademark Office*